June 12, 1928.

E. J. WILSON 1,673,541

ENDLESS TRACK PROPELLED VEHICLE

Filed Dec. 17, 1924     4 Sheets-Sheet 1

INVENTOR
Emery J. Wilson
BY
Richey Slough & Watts
ATTORNEYS.

June 12, 1928.  
E. J. WILSON  
1,673,541  
ENDLESS TRACK PROPELLED VEHICLE  
Filed Dec. 17, 1924  
4 Sheets-Sheet 2

INVENTOR  
Emery J. Wilson  
BY  
Richey Slough & Watts  
ATTORNEYS.

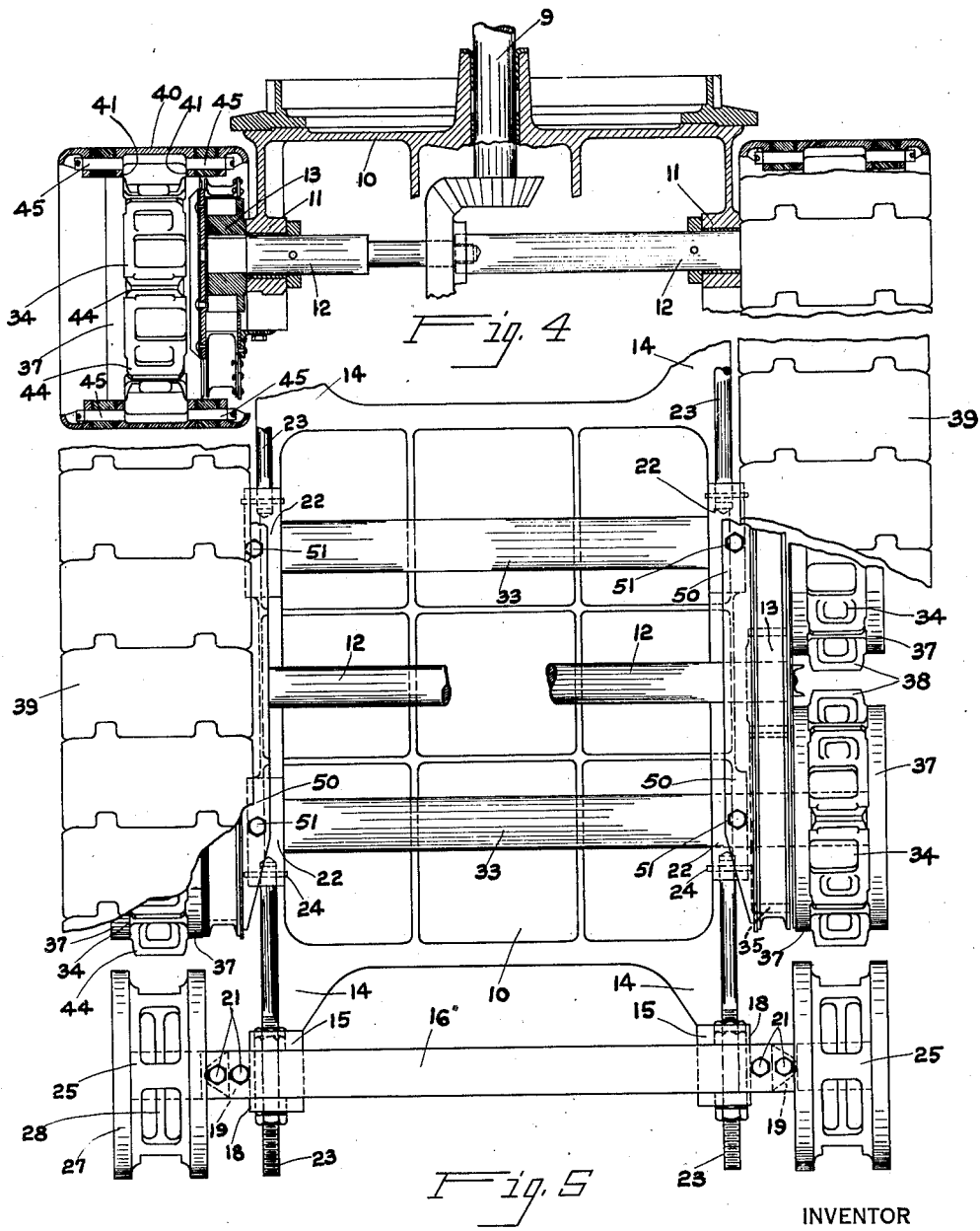

June 12, 1928.                                                              1,673,541
E. J. WILSON
ENDLESS TRACK PROPELLED VEHICLE
Filed Dec. 17, 1924    4 Sheets-Sheet 4
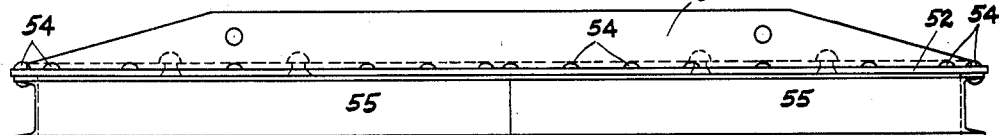
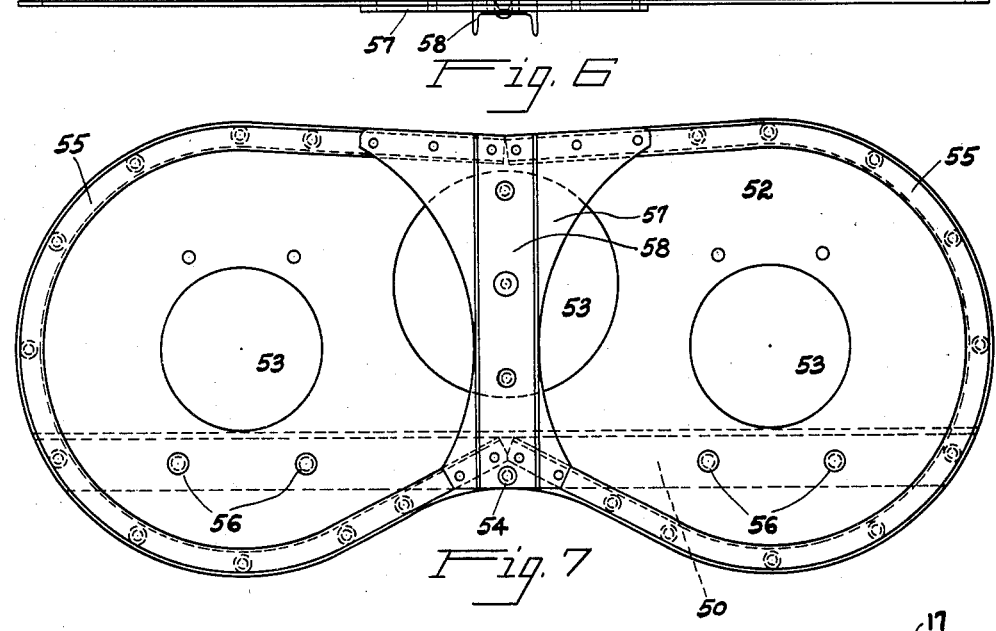
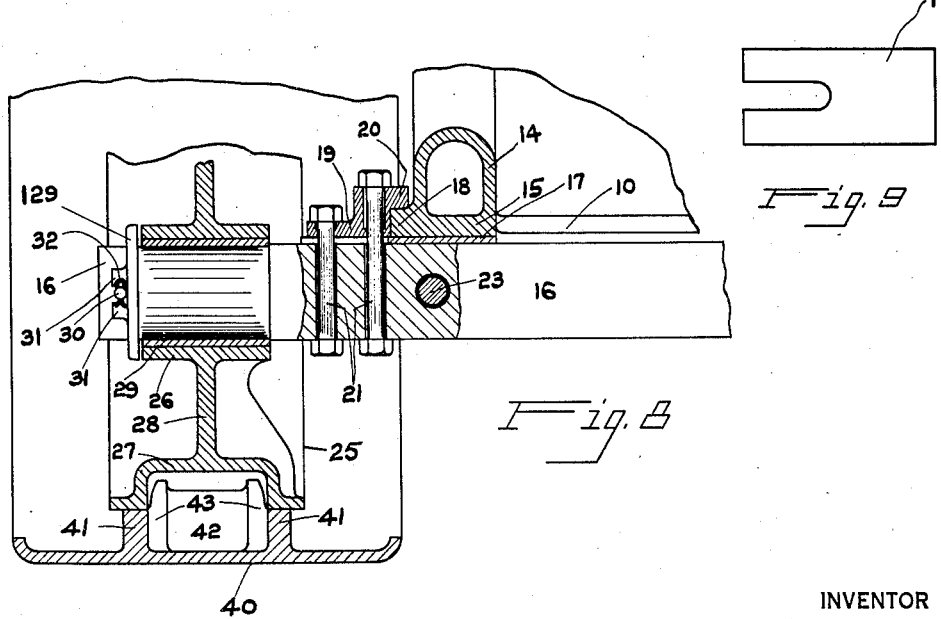
INVENTOR
Emery J. Wilson
BY Richey Slough & Watts
ATTORNEYS.

Patented June 12, 1928.

1,673,541

UNITED STATES PATENT OFFICE.

EMERY J. WILSON, OF CLEVELAND, OHIO, ASSIGNOR TO THE THEW SHOVEL COMPANY, OF LORAIN, OHIO, A CORPORATION OF OHIO.

ENDLESS TRACK-PROPELLED VEHICLE.

Application filed December 17, 1924. Serial No. 756,465.

This invention relates to vehicles which are supported and propelled upon continuous articulated treads.

The invention is illustrated and described as applied to that particular type of vehicles, commonly known as a truck, which is adapted to support a rotatable superstructure carrying power mechanism for excavating or handling loads and for propellig the truck by means of a vertical shaft passing through the center of rotation of the superstructure, such machines as, for example, power shovels and locomotive cranes. Power from the vertical shaft is transmitted to two traction devices, one at either side of the truck bed, each traction device comprising driving and idle rollers and a continuous tread composed of tread shoes so connected that they form a continuous track for the rollers to roll upon and drive the vehicle.

In this type of machine two entirely different conditions must be recognized in order to provide a structure which is best adapted to meet the requirements of both. These conditions are termed the working condition and the traveling condition. In practice these two conditions never have to be met at the same time in the case of the shovel, and very seldom in the case of the locomotive crane.

In the working condition the truck serves merely as a stable base for the superstructure to rotate upon, and since the digging force or the load lifted is usually at a considerable distance from the center of the machine, the center of gravity of the whole machine plus the load may come at any point within the stability limits of the truck base. The principal requirements for this condition are therefore sufficient strength in the truck parts to withstand the various loads coming upon them, and as large and stable a base as possible within the desired overall dimensions of the truck. The length of time a truck of this type is serviceable therefore depends almost entirely upon the propelling mechanism since it is the only part subject to wear. This mechanism comprises the two traction devices and the shafting, gears, etc., which transmit power from the central vertical shaft to the driving rollers of the traction devices.

The requirements for efficient traveling are many and various. A machine of this type not only has to exert its maximum effort in traveling over rough soft ground and steep grades encountered under working conditions but should be able to travel, either under its own power or by being towed, at comparatively high speeds over smooth hard roadways, in getting from one job to another, without damage either to itself or to the roadways. The center of gravity of the whole machine without load should come near the center of the truck in order to distribute the weight as evenly as possible over the supporting rollers. If the rollers at the ends of the continuous treads serve to support an appreciable part of this weight, the result when traveling over a smooth road is a bumpy action causing objectionable vibrations in the machine as well as serious damage to the road due to the flat sided wheel effect produced by the flat shoes in passing around and under these end rollers. This effect is not noticeable when traveling over rough and comparatively soft ground since the ridges of the flat sided wheel simply dig into the ground.

An object of the invention is to provide a direct and balanced drive from the central vertical shaft to the driving rollers of both treads so that greater power can be transmitted to the treads without overloading the parts, or parts will last correspondingly longer for the same power transmitted.

Another object of the invention is to provide a traction mechanism of such a type that the end rollers can be adjusted vertically to meet the requirements of a maximum stability base under the working conditions when these rollers are lowered, and also the requirements for efficient traveling and steering on hard roadways when these rollers are raised.

Another object of the invention is to provide a traction device of such a type that the propelling mechanism thereof can be raised as far as possible from the ground. The particular arrangement of the two driving rollers of each tread is such that the cross drive shaft can be raised above the line of centers of these rollers, and a proper meshing of the pinions on the ends of the cross shaft with the gears on the driving rollers established.

Another object of the invention resides in the provision of a shield which protects the driving gears of the traction devices from dirt and the like.

Another object of the invention is to provide an improved traction device in which wide faced rollers cooperate with tread shoe rails which are spaced apart for the purpose of relieving strains in the shoe and providing a wider stability base for the truck.

These and other objects, and the invention itself will be more readily understood from the following specification.

In the accompanying drawings—

Fig. 4 is an end view partially in section illustrating the shield for the driving mechanism;

Fig. 5 is a plan view of the under side of the vehicle;

Fig. 6 is a plan view of the shield removed from the vehicle;

Fig. 7 is a side elevation of the same; and

Fig. 8 is a fragmentary sectional view showing the mounting of one of the idler axles, and Fig. 9 shows a plan view of a filler plate shown in section in Fig. 8.

Figure 1:
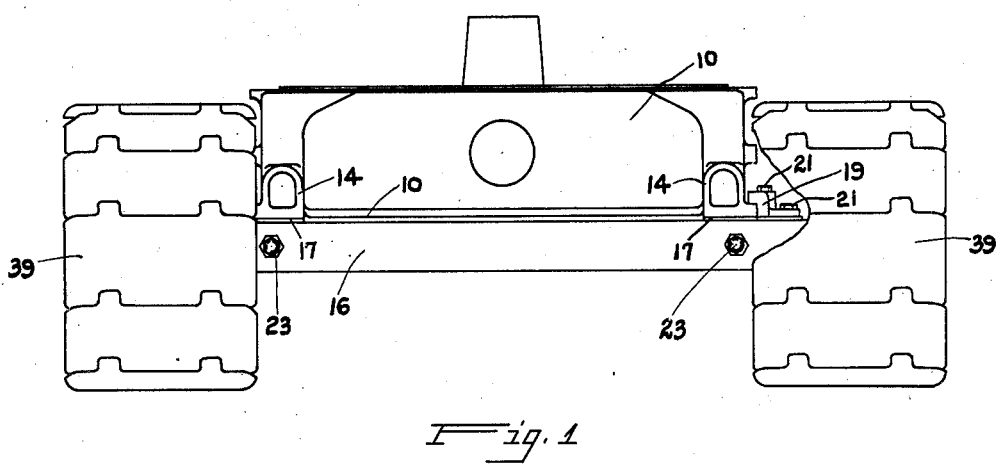
Fig. 1 is an end elevation of a vehicle embodying my invention.
Figure 2:
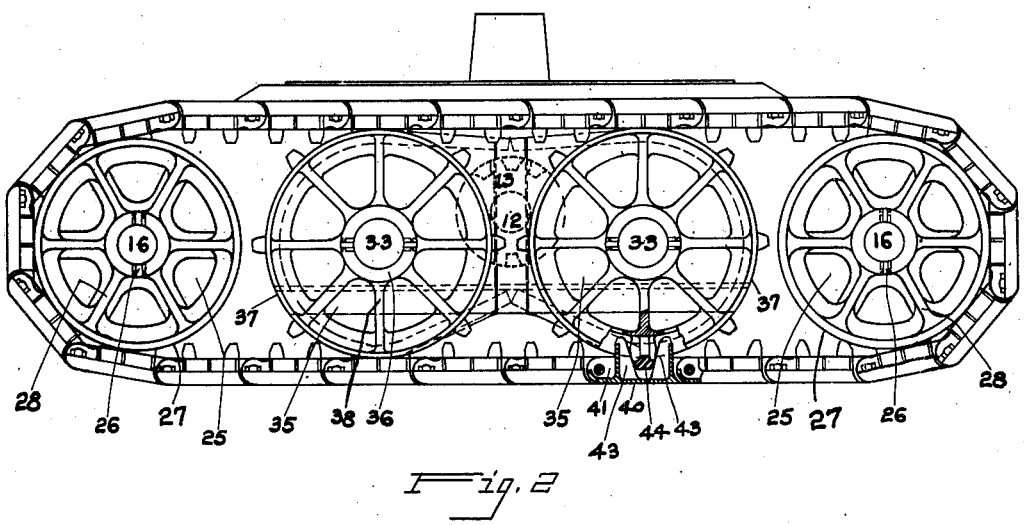
Fig. 2 is a side elevation of the same.
Figure 3:
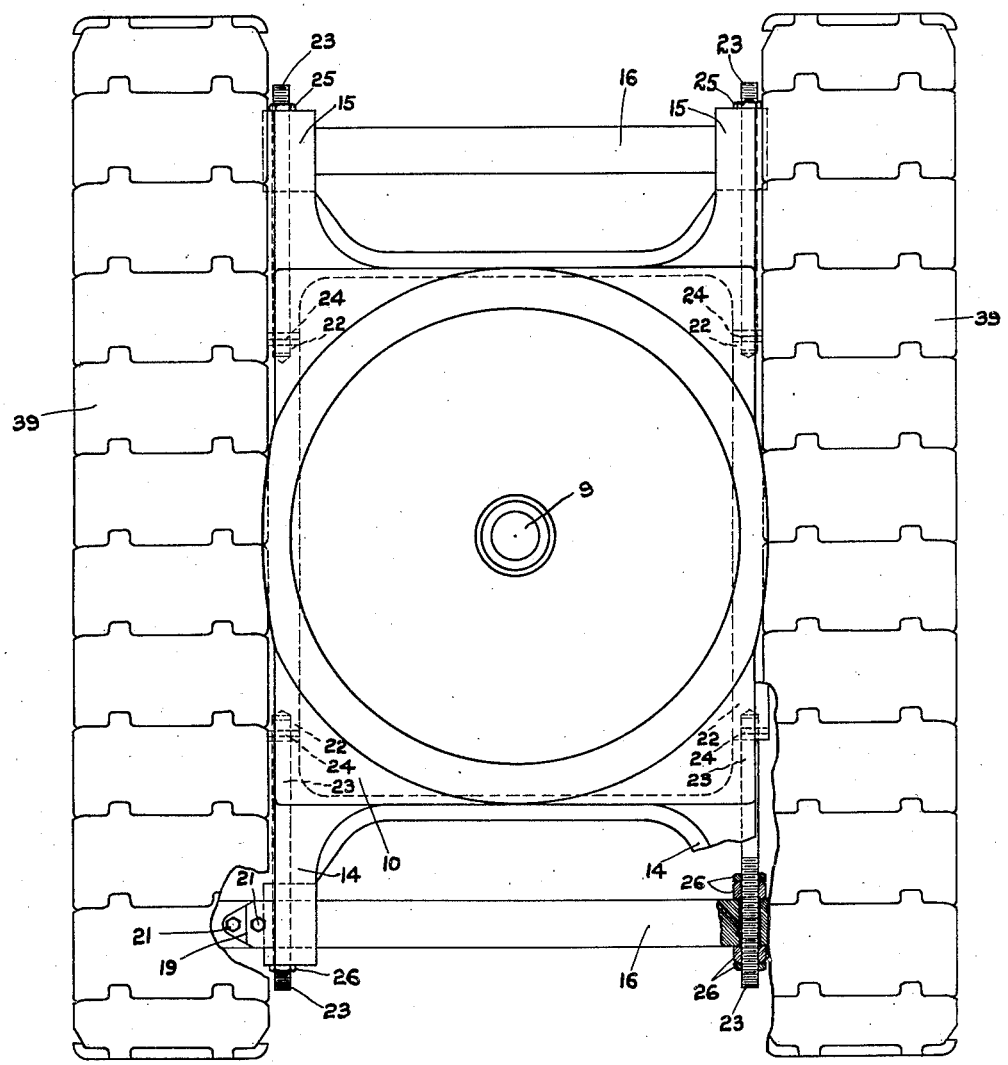
Fig. 3 is a top plan of the vehicle.

Referring to the drawings by characters of reference 10 represents the main frame of a vehicle, and for purposes of illustration, I have shown the frame formed of a casting for supporting the rotatable superstructure of a steam shovel, or similar mechanism.

The bottom of the frame is provided on each side with a depending bearing 11, located substantially centrally thereof, for receiving and supporting the aligned driving shafts 12, which are driven from a power plant by a centrally located shaft 9 extending from the rotatable frame in a manner customary in vehicles of this type. A driving pinion 13 is secured upon the outer end of each shaft, adjacent the side of the main frame.

The main frame is provided at each side of both ends with outwardly, longitudinally projecting extensions 14 provided with bearing extensions 15 to which are secured adjustable axles 16, and at the sides of the other end with similarly arranged extensions 15, which extensions are preferably formed integrally with the main frame. The underside of such end extensions of the main frame are flat, and preferably square axles 16 are secured thereagainst. Bearing or filler plates 17 are placed intermediate the extensions 15 and the axles 16, and these plates are slotted as shown in Fig. 9, lengthwise at one end and are adapted to be removed to lower the vertical position of the axles 16 and the idlers 25 carried thereby.

The bearing extensions 15 are provided with shoulders 18, which extend from the outer sides thereof, and clamp members 19 are provided with shoulders 20. The clamp members are seated upon the bearing plates at the sides of the shoulders 18, and the shoulders 20 thereof are arranged to engage upon the shoulders 18, so that the axles will thereby be supported by the main frame. Bolts 21 extend through apertures in the clamp members, bearing plates and axles, and nuts are screwed upon the bolts to secure such members together. By loosening the bolts 21 at one end of the machine, the base will move by gravity to permit the bearing plates to be inserted or removed when the boom is placed at the opposite end of the vehicle.

The main frame is provided with depending bearings 22 which are arranged in longitudinal alignment with the extensions 14, and rods 23 are pivotally secured in apertures therein by pins 24. The projecting ends of such rods are threaded and extend through apertures in the square shafts 16, and nuts 26 are threaded upon the rods into engagement with the opposite sides of the shafts, thereby securing them with the main frame. By adjusting the position of the nuts the axles can be positioned in the longitudinal relation with the main frame which may be desired to regulate the slack of the continuous treads.

The end of the axles 16 are round and provide journals for idler wheels or rollers 25 which are loosely mounted thereupon. These wheels are preferably formed as a single casting, and consist of a central hub 26, an outer rim 27, and radial spokes 28 which join the rim with the hub. A bushing 29 is interposed intermediate each of the idler wheels and the axles 16, and a cap 129 is mounted upon each of the ends of the axles and maintained therewith by pins 30 which extend through the shafts and intermediate the spaced bosses 31 projecting from the caps. Cotter keys 32 are inserted through transverse apertures in the pins 30 to secure them in the relation described. It will be observed that the caps are removable, and that they retain the idler wheels upon the axles when in position.

Fixed axles 33 extend transversely beneath the main frame and are mounted in the bearings 22 which project beneath the opposite sides of the frames. The ends of these shafts project from the sides of the main frame and vehicle driving rollers 34 are rotatably carried thereby, in longitudinal alignment with the idler wheels. The driving rollers are secured upon the shafts 33 by caps in the same manner as the idler wheels are secured upon their shafts. The driving rollers are formed with gears 35 which project from the inner sides thereof when assembled, and such gears mesh with the driving pinions 13 on each side of the vehicle. The driving rollers are each, preferably, formed as an integral casting, and consist of a hub 36, a rim 37, and radially extending spokes 38 connecting the hub and rim. When the shafts 12 are driven the pinions 13 will rotate the driving rollers 34 and propel the vehicle along the endless tracks which surround the driving rollers and idler wheels. The vehicle can be steered in the customary manner by disconnecting one of the shafts 12, in which event the driving rollers on one side only will be driven.

The continuous treads 39 which encircle the driving rollers and the idler wheels at each side of the main frame consist of a plurality of similar links or shoes which are pivotally connected together. These links are preferably formed as a casting and consist of a flat shoe, or ground engaging portion 40, from which a pair of spaced rails 41 extend in longitudinal parallel relation. A web 42 extends transversely between the rails at each end of the links, and teeth 43 extend longitudinally from each end thereof toward the middle of the shoe. These teeth provide spaced angular opposed faces between which the teeth of the driving rollers project and cooperate with to propel the vehicle upon the treads. The teeth 43 are formed with their pitch line in substantially the same horizontal plane as the surface of the rails and preferably so that they extend substantially equal distances above and below the surface of the rails. The teeth 44 of the driving rollers are formed and arranged to extend intermediate the faces of the teeth of the links, and their pitch line lies substantially at the bearing surface 37 of the sprocket rims. The preferred form of teeth, of the driving rollers and the links, will extend equal lengths above and below the bearing surfaces of the rims thereof, and this arrangement will retain the tracks in position, cause a minimum amount of friction when operated, and will provide a rolling contact between the sprockets and the track, thereby requiring minimum power to propel the vehicle and providing long life for the tracks. The ends of the links are rabbeted together in a conventional manner, and pintle pins 45 extend through the adjacent end portions of adjoining links. The idler wheels are provided with a centrally depressed rim, which permits the teeth of the track to extend therein, when the link rails are in engagement with the bearing surfaces of the rims.

The rails of the treads bear against the top and bottom of the rims of the driving rollers on each side of the teeth, and the track rails also extend around and bear against the rims of the idler wheels. When the vehicle is traveling upon a road or smooth surface, it is normally supported only by the driving rollers which rest upon the track rails, the rims of the rollers engaging the rails. The idler wheels are preferably of smaller diameter than the driving rollers and are mounted so that when the vehicle travels upon the road their lowermost portion will be in a plane above that of the driving rollers.

With such an arrangement of the driving rollers and idlers, the vehicle is propelled and is entirely supported by the intermediate driving rollers, thereby eliminating the lengthwise strains to which the tracks are subjected when the vehicle is supported in any other manner, or driven by sprockets positioned in any other relation. When stationary, or at a place in which work is to be performed the lower portions of the idlers can be placed in the same plane with that of the driving rollers by insertion of the bearing plates 17, to prevent racking and to provide a longer bearing support for the vehicle.

A shield is provided intermediate each side of the main frame and the driving rollers to protect the gears from foreign substances such as dirt, sand, and the like. An angle iron 50 is secured to the bearings 22 on each side of the frame, by bolts 51, and serve to support the shields. A plate 52 extends adjacent the angle iron in a vertical plane and is provided with apertures 53 through which the shafts 33 and 13 extend. A pair of curved channel irons 55 extend around the edge of the plate 52 and are secured together by rivets 54. Rivets 56 are provided to secure the plate to the angle iron 50. A bracket 57 extends intermediate to the top and bottom ends of the channel members and is secured thereto by rivets, and a vertically extending channel member 58 is secured to central portion of the bracket to strengthen the joint formed by the ends of the frame members 55. The shield thus formed extends over the pinions 13 and the driving roller gears 35, protecting them from foreign substances.

This case is a companion case to my co-pending applications filed simultaneously herewith and bearing Serial Numbers 756,464 and 456,485 and to which cases reference may be had for certain details of construction shown more fully therein.

Various changes may be made in the details of the device shown and described without departing from the spirit of my invention and the scope of the appended claims.

What I claim is:—

1. In a vehicle of the class described, a pair of traction mechanism, each comprising a pair of idler wheels, a pair of driving rollers intermediate said idler wheels and in longitudinal alignment therewith, and a continuous tread surrounding said idler wheels and said rollers, said driving rollers cooperating with said continuous tread to propel and normally support the entire vehicle thereupon and said idlers being adjustable vertically to assist in support of said vehicle.

2. In a vehicle of the class described, a main frame, a plurality of shafts carried by said main frame transversely thereof, idler wheels rotatably mounted upon the ends of the end shafts adjacent each side of said main frame, driven rollers mounted upon the shafts intermediate the idler wheels, said rollers having each a gear integral therewith, driven axles carried by said frame, driving pinions intermediate and meshing with said integral gears, said driving pinions being secured to said driven axles, and a continuous tread surrounding the idler wheels and driving rollers on each side of said vehicle, said driving rollers normally entirely supporting the main frame upon the treads and propelling the vehicles thereupon and said idlers being adjustable vertically to assist in support of said vehicle.

3. In a vehicle of the class described, a main frame, shafts extending transversely beneath said frame, idler wheels carried by the end shafts, driving rollers of greater diameter than the idler wheel carried by the intermediate shafts, said rollers and idlers being in longitudinal alignment, a continuous tread surrounding the rollers and idler wheels on each side of said main frame, and means for vertically adjusting said idler wheel shafts relative to said main frame whereby the weight of the vehicle may be carried by said rollers only, or by said rollers and said idlers.

4. In a vehicle of the class described, a main frame, shafts extending transversely beneath the main frame and secured thereto, idler wheels rotatably mounted upon the ends of the end shafts adjacent each side of the main frame, driving rollers rotatably mounted upon the shafts intermediate said end shafts, adjustable means intermediate the main frame and said end shafts for regulating the relation of said shafts with said frame in a vertical plane, and an endless track surrounding the sprockets and idlers on each side of said frame, said driving rollers cooperating with said tracks to propel the main frame thereupon, and having track engaging peripheral portions disposed below the plane of track engaging peripheral portions of said idlers.

5. In a vehicle of the class described, a main frame, a pair of axles extending transversely beneath said main frame, idler wheels rotatably mounted upon the ends of said axles on each side of said main frame, means for supporting said axles beneath said main frame, a rod extending through each end of said axles, said rods extending lengthwise of said main frame and being pivotally secured thereto, said axles being movable upon said rods lengthwise of said main frame, and means adjustable upon said rods for securing said axles in desired longitudinal position relative to said main frame.

6. In a vehicle of the class described, a main frame, a pair of axles extending transversely beneath said main frame, idler wheels rotatably mounted upon the ends of said axles on each side of said main frame, means for supporting said axles beneath said main frame, a rod extending through each end of said axles, said rods extending lengthwise of said main frame and being pivotally secured thereto, said axles being movable upon said rods lengthwise of said main frame, and means adjustable upon said rods for securing said axles in desired longitudinal position relative to said main frame, and means for adjusting said axles vertically relative to said frame.

7. In a vehicle of the class described, a pair of traction mechanisms, each comprising a pair of idler wheels, a pair of driving rollers intermediate of and of greater diameter than said idler wheels, and in longitudinal alignment therewith, and a continuous tread surrounding said idler wheels, and said rollers, said rollers co-operating with said continuous tread to propel and normally support the entire vehicle thereupon, and said idler wheels being adjustable vertically to assist in support of said vehicle.

In testimony whereof I hereunto affix my signature this 18th day of November, 1924.

EMERY J. WILSON.

CERTIFICATE OF CORRECTION.

Patent No. 1,673,541.                                  Granted June 12, 1928, to

EMERY J. WILSON.

It is hereby certified that error appears in the printed specification of the above numbered patent requiring correction as follows: Page 1, line 9, for the misspelled word "propellig" read "propelling"; page 3, lines 17 and 18, for "portiou" read "portion"; line 92, for "serve" read "serves", and line 113, for number "456,485" read "756,485"; and that the said Letters Patent should be read with these corrections therein that the same may conform to the record of the case in the Patent Office.

Signed and sealed this 31st day of July, A. D. 1928.

(Seal)

M. J. Moore,
Acting Commissioner of Patents.